(12) United States Patent
Jeong et al.

(10) Patent No.: US 9,470,708 B2
(45) Date of Patent: Oct. 18, 2016

(54) MEMS RESONANT ACCELEROMETER

(75) Inventors: Hyeong-Gyun Jeong, Gyeonggi-do (KR); Jin-Woo Song, Seoul (KR)

(73) Assignee: MICROINFINITY, INC., Suwon-Si (KR)

( * ) Notice: Subject to any disclaimer, the term of this patent is extended or adjusted under 35 U.S.C. 154(b) by 296 days.

(21) Appl. No.: 14/348,702

(22) PCT Filed: Sep. 30, 2011

(86) PCT No.: PCT/KR2011/007284
§ 371 (c)(1),
(2), (4) Date: Mar. 31, 2014

(87) PCT Pub. No.: WO2013/047933
PCT Pub. Date: Apr. 4, 2013

(65) Prior Publication Data
US 2014/0238132 A1  Aug. 28, 2014

(30) Foreign Application Priority Data
Sep. 30, 2011  (KR) .................. 10-2011-0099723

(51) Int. Cl.
*G01P 15/10* (2006.01)
*G01P 15/097* (2006.01)
(Continued)

(52) U.S. Cl.
CPC ......... *G01P 15/0802* (2013.01); *G01P 15/097* (2013.01); *G01P 15/125* (2013.01)

(58) Field of Classification Search
CPC ............. G01P 15/0802; G01P 15/097; G01P 15/125; G01C 19/574; G01C 19/5755; G01C 19/5769

USPC ............................ 73/514.29, 514.16, 504.12
See application file for complete search history.

(56) References Cited

U.S. PATENT DOCUMENTS 2,984,111 A * 5/1961 Kritz .................... G01P 15/097
310/329
4,750,363 A * 6/1988 Norling ................. G01P 15/097
73/497

(Continued)

FOREIGN PATENT DOCUMENTS

JP 08-075475 A 3/1996
JP 2000-292174 A 10/2000
(Continued)

OTHER PUBLICATIONS

International Search Report of PCT/KR2011/007284, dated Oct. 10, 2012.

*Primary Examiner* — Helen Kwok
(74) *Attorney, Agent, or Firm* — Perkins Coie LLP

(57) ABSTRACT

Provided is a micro electro mechanical system (MEMS) resonating accelerometer. The MEMS resonating accelerometer according to the present invention comprises: a first inertial mass; a second inertial mass which is spaced at a predetermined distance from the first inertial mass on a first axis; an elastic body which is provided between the first and second inertial masses so as to apply elasticity; and a tuning fork which is connected to the elastic body and measures the change of frequency according to acceleration, wherein the longitudinal direction of the tuning fork is parallel to a second axis which is perpendicular to the first axis, the elastic body has an opening portion being in a circular shape with a portion thereof removed, and one end of the tuning fork penetrates the opening portion and is connected to the inner surface of the elastic body.

6 Claims, 7 Drawing Sheets

(51) Int. Cl.
*G01P 15/08* (2006.01)
*G01P 15/125* (2006.01)

(56) References Cited

U.S. PATENT DOCUMENTS

| | | | | |
|---|---|---|---|---|
| 4,970,903 A * | 11/1990 | Hanson | ............... | G01P 15/097 73/862.59 |
| 5,610,335 A | 3/1997 | Shaw et al. | | |
| 7,124,633 B2 * | 10/2006 | Quer | ............... | G01P 15/097 73/514.15 |
| 8,297,121 B2 * | 10/2012 | Quer | ............... | G01P 1/006 73/514.29 |
| 8,375,788 B2 * | 2/2013 | Robert | ............... | G01C 19/5726 73/504.12 |
| 8,616,059 B2 * | 12/2013 | Walther | ............... | B81B 3/0051 73/514.29 |
| 8,783,107 B2 * | 7/2014 | Robert | ............... | G01C 19/574 73/514.29 |
| 8,939,027 B2 * | 1/2015 | Watanabe | ............... | G01P 15/097 73/514.29 |

FOREIGN PATENT DOCUMENTS

| | | |
|---|---|---|
| JP | 2003510592 A | 3/2003 |
| KR | 1020040050399 | 6/2004 |
| KR | 10-0432190 B1 | 8/2004 |

* cited by examiner

MEMS RESONANT ACCELEROMETER

RELATED APPLICATION

The subject application is a U.S. National Stage application of International Application No. PCT/KR2011/007284, filed on Sep. 30, 2011, which claims the priority of Korean Patent Application No. 10-2011-0099723, filed on Sep. 30, 2011, the contents of which are herein incorporated by reference in its entirety.

BACKGROUND OF THE INVENTION

1. Field of the Invention

The present invention relates to a micro electro mechanical system (MEMS) resonating accelerometer, and more particularly, to a MEMS resonating accelerometer having improved temperature sensitivity.

2. Description of the Related Art

With the advance of microfabrication technology employing microelectromechanical system (MEMS) techniques, the recently proposed accelerometers have been downsized, more sophisticated, and reduced in price. At early development stages of MEMS technology, the main stream was piezoresistive accelerometers using piezoresistive characteristics based on silicon microfabrication technology in semiconductor manufacturing processes. However, recently, capacitive accelerometers are continually dominating the piezoresistive accelerometer market, except for particular fields requiring high G detection.

One of various advantages achieved by MEMS technology in developing MEMS accelerometers is a downsized dimension. Examples of application fields of miniaturized and low-priced MEMS inertial sensors include a car navigation system, automotive air-bag control, avoidance of jiggling a camera or video, a mobile telephone, robot posture control, gesture input recognition for a game, and detection of rotation and impact on HDD, and displacement type accelerometers (e.g., a piezoresistive accelerometer, a capacitive accelerometer, etc., in which a displacement of inertial masses in an accelerometer is changed by the applied acceleration and the displacement is converted to a voltage to measure the applied acceleration), are generally used.

MEMS accelerometers, aimed at attainment of performance comparable to the conventional mechanical accelerometer in addition to the downsized dimension, are mostly applied to navigation systems to replace the conventional mechanical accelerometer. Resonant accelerometers are generally used as navigational accelerometers.

The resonant accelerometer includes an inertial mass part whose displacement is generated by an external acceleration, a spring part limiting the direction of the mass movement in one direction while supporting the inertial mass part, and a resonator part whose frequency changes due to a tensile or compressive force. When acceleration is externally applied, the inertial mass part moves and the resonator part connected to the inertial mass part receives the tensile or compressive force according to the direction of the externally applied acceleration. The resonator part having received the tensile or compressive force may have a decreasing or increasing resonance frequency. The external acceleration is calculated based on the changed resonance frequency.

According to the resonating accelerometer, the external acceleration is measured based on a change in the resonance frequency. Accordingly, it is necessary to minimize error factors, which may cause a change in the resonance frequency, since factors other than external acceleration can change the resonance frequency. Therfore the performance of the resonating accelerometer is determined by the error factors.

Examples of the error factors affecting the resonance frequency include a change in the material's Young's modulus, change in the stress due to material's thermal expansion, stress due to differences between thermal expansion coefficients of different materials used, noises/vibrations due to external environment factors, and more. Specifically, the change in the stress due to the material's thermal expansion is determined by the shape of a structure, and a numerical value indicating the change in the stress due to the material's thermal expansion varies with the structure shape. When a compressive force or a tensile force is applied to the resonator by thermal expansion, there is a change in the output of the accelerometer as if external acceleration is applied to the resonator. It is difficult to separate the output by external acceleration and thermal expansion. In a state where the external acceleration is not applied, there is a change in the accelerometer output, causing an error.

SUMMARY OF THE INVENTION

The technical purpose of present invention is to solve the problems of the prior art, and to provide a resonant-type accelerometer having a double-ended tuning fork (DETF) structure with minimized temperature sensitivity.

The other object of the present invention is to provide a MEMS resonating accelerometer, which can structurally offset an error value generated by thermal expansion due to change in the temperature.

The above and other objects of the present invention will be described in the following description of the preferred embodiments.

In accordance with an aspect of the present invention, the above and other objects can be accomplished by providing a micro electro mechanical system (MEMS) resonating accelerometer, including a first inertial mass; a second inertial mass which is spaced a predetermined distance apart from the first inertial mass on a first axis; an elastic body which is provided between the first and second inertial masses to apply elasticity; and a tuning fork which is connected to the elastic body and measures the change of frequency according to acceleration, wherein the longitudinal direction of the tuning fork is parallel to a second axis which is perpendicular to the first axis, the elastic body has an opening portion being in a circular shape with a portion thereof removed, and one end of the tuning fork penetrates the opening portion and is connected to the inner surface of the elastic body.

The elastic body may be in a semi-circular shape, and the one end of the tuning fork may penetrate the center of the inside of the circle of the elastic body to then be connected to the inner surface of the elastic body.

The tuning fork may be connected to a central portion of the inner surface of the elastic body.

The first and second inertial masses and the elastic body may have the same thermal expansion coefficient.

One end of each of the first and second inertial masses is fixed such that the first and second inertial masses undergo thermal expansion in such a direction as they get closer to each other or distant from each other, and one end of the tuning fork is fixed such that it undergoes thermal expansion in such a direction as it gets closer to or distant from the first and second inertial masses.

During thermal expansion, a vector sum of a displacement of the elastic body resulting from first-axis directional thermal expansion of the first inertial mass and the second inertial mass, and displacements of the first inertial mass and the second inertial mass resulting from second-axis directional thermal expansion may be equal to a displacement of the tuning fork in a direction of the second axis perpendicular to the first axis.

As described above, the present invention provides a resonant-type accelerometer having a double-ended tuning fork (DETF) structure with minimized temperature sensitivity.

In addition, the present invention also provides a MEMS resonating accelerometer, which can structurally offset an error value generated by thermal expansion due to temperature change.

The advantageous effects of the present invention are not limited to those described above and will become apparent by the references of the following detailed descriptions of exemplary embodiments.

BRIEF DESCRIPTION OF THE DRAWINGS

For a better understanding of the present disclosure, preferred embodiments thereof are now described, purely by way of non-limiting example and with reference to the attached drawings, wherein.

DETAILED DESCRIPTION OF EXEMPLARY EMBODIMENTS OF THE INVENTION

Figure 1:
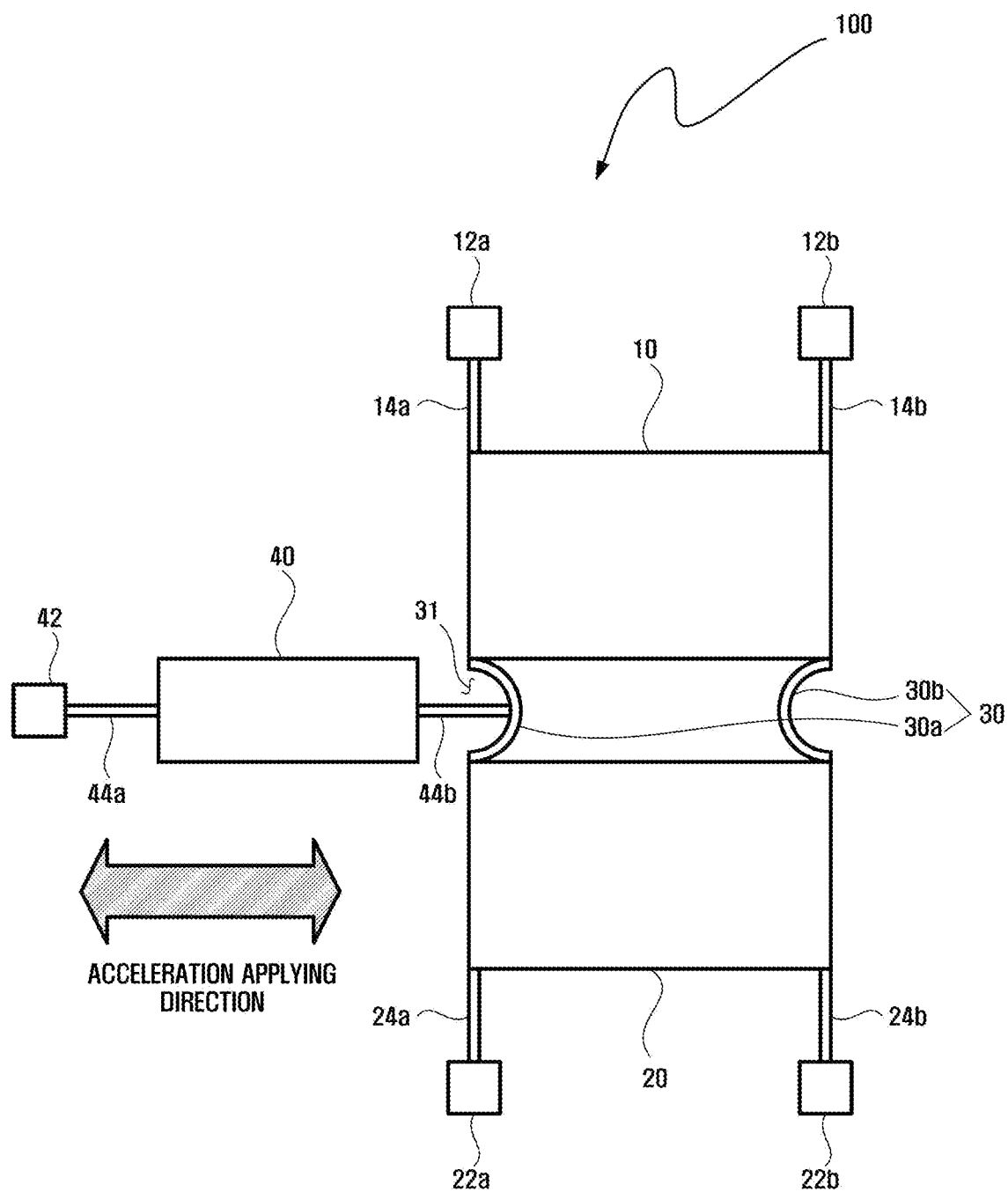
FIG. 1 is a schematic view of a MEMS resonating accelerometer according to an embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks illustrated in succession may in fact be executed substantially concurrently or the blocks may sometimes be executed in the reverse order, depending upon the functionality involved.

Micro electro mechanical system (MEMS) resonating accelerometer according to an embodiment of the present invention will be described with reference to FIG. 1.

FIG. 1 is a schematic view of a MEMS resonating accelerometer according to an embodiment of the present invention.

The MEMS resonating accelerometer 100 may include a first inertial mass 10, a second inertial mass 20, an elastic body 30, and a tuning fork 40.

The first and second inertial masses 10 and 20 are shaped of a rectangular frame and can be configured to movably float on a substrate (not shown).

The first inertial mass 10 is fixed on the substrate by a first anchor part 12a and a second anchor part 12b. The first inertial mass 10 and the first and second anchor parts 12a and 12b are movably connected to each other by elastic connection members 14a and 14b. The members 14a and 14b can be in a form of a leaf spring as an example. The second inertial mass 20 is fixed on the substrate by a third anchor part 22a and a fourth anchor part 22b, as in first inertial mass 10. The second inertial mass 20 and the third and fourth anchor parts 22a and 22b are movably connected to each other by elastic connection members 24a and 24b. The members 24a and 24b can be in a form of a leaf spring.

The first inertial mass 10 and the second inertial mass 20 are located at a predetermined distance apart from each other on a predetermined axis (an up-and-down axis of FIG. 1) and can be connected to each other by an elastic body 30 in order to move in the same direction. The first inertial mass 10 and the second inertial mass 20 can have same material. In case where first inertial mass 10 and the second inertial mass 20 are fabricated with different materials, materials having same thermal expansion coefficient can be used. The MEMS resonating accelerometer of the present invention may include an accelerometer sensing an acceleration of one axis among three perpendicular axes. The MEMS resonating accelerometer illustrated in FIG. 1 is capable of sensing acceleration in the left-and-right direction of FIG. 1.

The inertial masses 10, 20 connected to each anchors 12a and 12b are shifted to left within the elastic range of connection members 14a, 14b, 24a and 24b when acceleration is applied to the right side of FIG. 1.

The elastic body 30 is positioned between the first inertial mass 10 and the second inertial mass 20 to allow equal excitation in translational direction. The errors due to external forces other than acceleration (eg. Force by thermal expansion) can be reduced by canceling the external force by reducing the temperature sensitivity of present invention of MEMS resonating accelerometer. The prevention of thermal expansion by elastic members will be dealt in detail later.

Throughout the specification, the term "thermal expansion" may refer to both shrinkage and expansion of a material due to a temperature change. Thus, when an external temperature rises, the first and second inertial masses 10 and 20 may undergo thermal expansion, and when an external temperature drops, the first and second inertial masses 10 and 20 may undergo thermal shrinkage. For the ease of understanding, the term thermal shrinkage will not be used. The elastic body 30 may have an opening portion 31 of a circular elastic body. As shown in FIG. 1, the elastic body 30 may have, but is not limited to, a semi-circular shape. The present invention does not limit the material of the elastic body 30, but the elastic body 30 may be formed using any material as long as it has an elasticity to offset the thermal expansion of the first and second inertial mass 10, 20 and the tuning fork 40.

The tuning fork 40 is connected to the elastic body 30 and measures a change in the frequency depending on the acceleration applied to the MEMS resonating accelerometer of the present invention. Throughout the specification the tuning fork 40 may refer to a double-ended tuning fork (DETF) where a change in the stress is generated by thermal expansion.

The tuning fork 40 may be fabricated using the same material as the first inertial mass 10 and/or the second inertial mass 20. The tuning fork 40 may have a different material but with the same thermal expansion coefficient of the first inertial mass 10 and/or the second inertial mass 20. One end of the tuning fork 40 is connected to an inner surface of the elastic body 30 by penetrating the opening portion 31 of the elastic body 30. In detail, the one end of the tuning fork 40 may be connected to the inner surface of the elastic body 30 while penetrating the center of the circle of the elastic body 30. The one end of the tuning fork 40 can be connected by being in contact with the center of the inner surface of the elastic body 30

The tuning fork 40 may include a fixed electrode and a movable electrode (not shown) disposed on the same plane as the first and second inertial masses 10 and 20 while coupled to each other by a comb structure. The fixed electrode and the movable electrode may form an electrode pair and the gaps between the electrodes and first and second inertial masses 10, 20 may generate capacitance which can be detected when a voltage is applied. The capacitance may vary when the first and second inertial masses 10 and 20 move. For example, the capacitance may vary according to a distance between the fixed electrode and the movable electrode. The variation in capacitance may be determined by sensing a current variation from an amplifier (not shown) connected to the fixed electrode and/or the movable electrode.

In some embodiments, the tuning fork 40 may include a plate (not shown) vibrating in a predetermined direction and a driving electrode (not shown) to drive the vibration plate.

The beams of the tuning fork 40 may vibrate regularly by the driving electrode, such that the plate vibrates in up-and-down direction of FIG. 1. In a case where the plate vibrates in the up-and-down direction of FIG. 1 and when an external force is applied in the left-and-right direction of FIG. 1, the external force may act on an inertial mass as an inertia, allowing the inertial mass to moves in a opposite direction of the acceleration resulting compressive and tensile force on the tuning fork through the elastic members connected to a inertial mass. In a resonating tuning fork, effective stiffness of a beam is changed by the compressive force or by the tensile force to cause a change in the resonance frequency, which can be expressed by the following Equations (1) and (2):

$$f_n = 1/2\pi \sqrt{((K + \alpha Ma)/m)} = f_0 \sqrt{(1 + (\alpha Ma/K))} = f_0 \sqrt{(1 + (Ma/C))} \quad (1)$$

where K is the beam stiffness, m is the beam equivalent mass, α is a constant, M is a suspended mass, f0 is a zero load frequency, fn is a beam natural frequency, a is an input acceleration, and C is an Euler buckling load;

$$A_{ia} = (f - f_0)/K_1 \quad (2)$$

where Aia is an indicated acceleration, i.e. applied acceleration.

In a state where no external force is applied to the first and second inertial masses 10 and 20, the frequency of a signal sensed by the tuning fork 40 remains constant. However, when an external force is applied to the first and second inertial masses 10 and 20, the frequency of a signal sensed by the tuning fork 40 varies, and the magnitude of the externally applied acceleration can be obtained from a conversion coefficient measured by performance evaluation, represented by a linear scale factor K1 (Hz/g) in Equation (2) and a difference in the resonance frequency.

As described above, the MEMS accelerometer according to the embodiment of the present invention detects the frequency from the capacitance value of a capacitor formed between the electrodes provided in the tuning fork 40, thereby detecting a difference in the resonance frequency depending on the applied acceleration.

Figure 2:
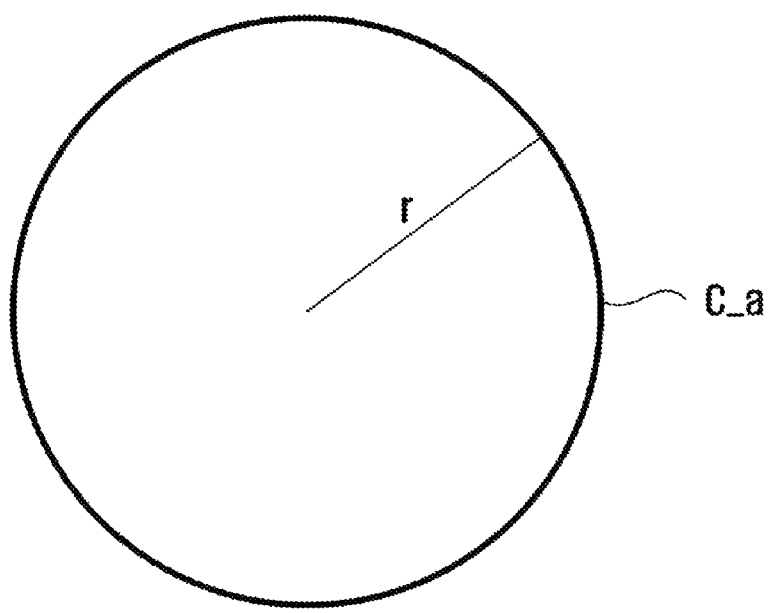
FIGS. 2 and 3 illustrate the principle of transforming a circular elastic body due to an external force.
Figure 3:
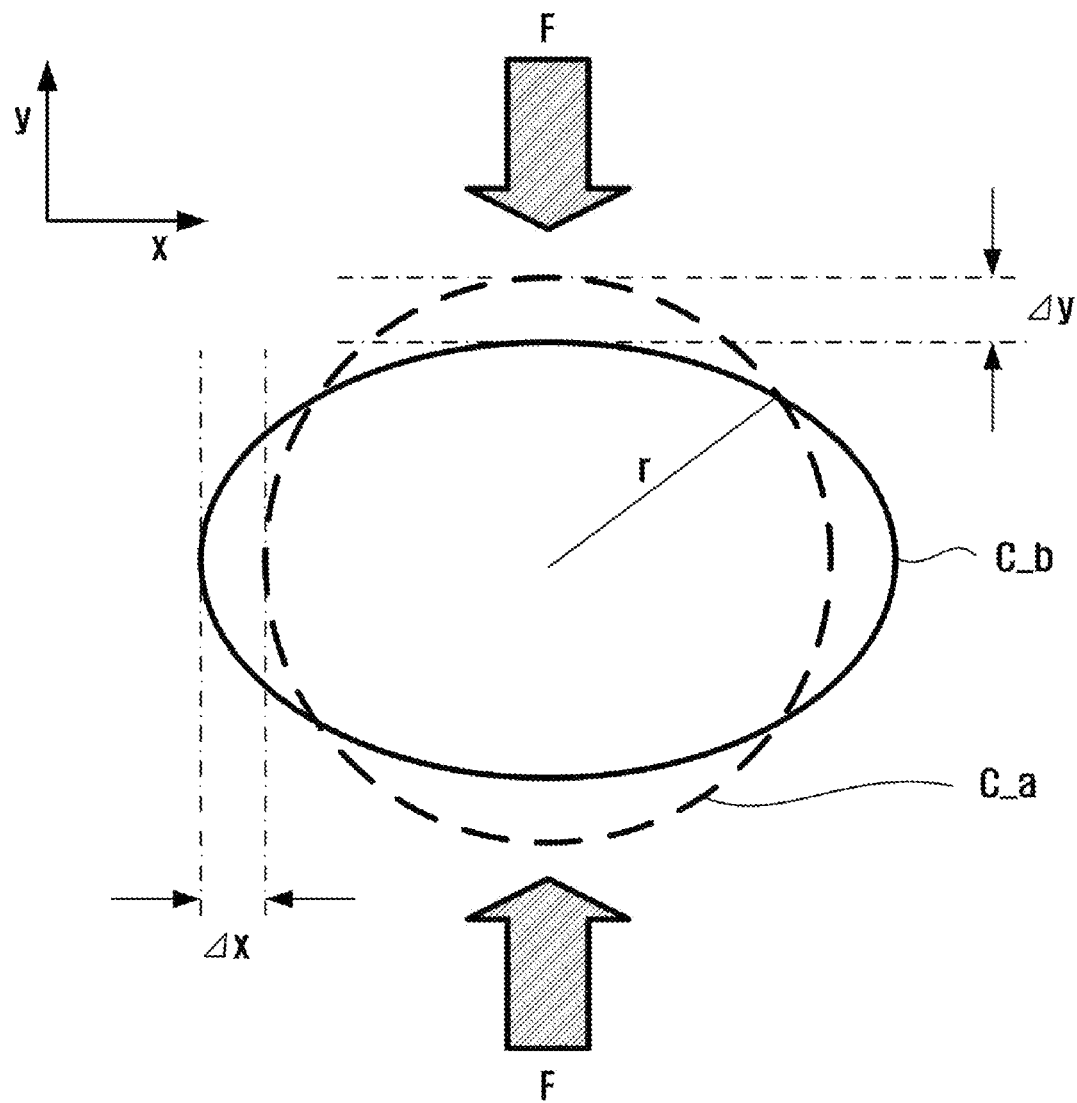
Figure 4:
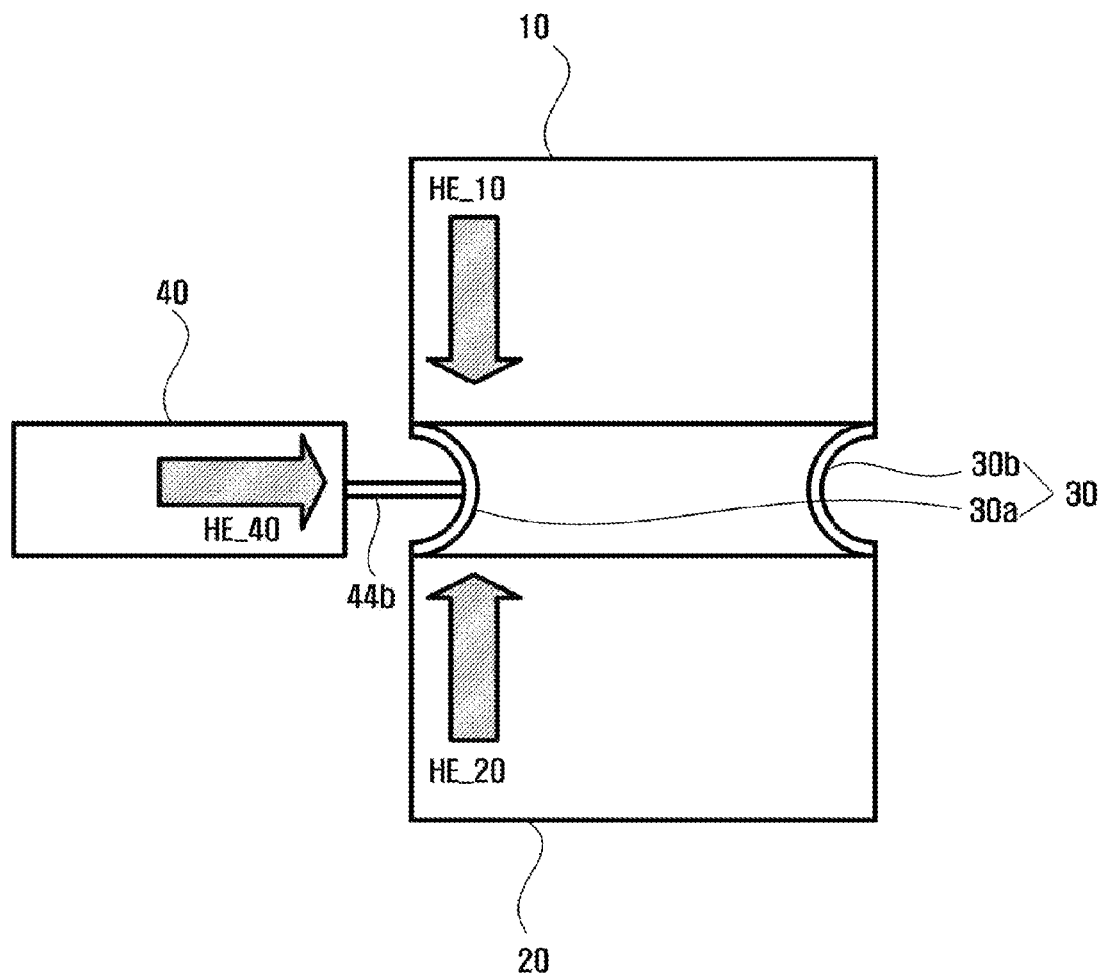
FIGS. 4 to 6 illustrate transformed structures of the elastic body (30) as a result of thermal expansion shown in FIG. 1.
Figure 5:
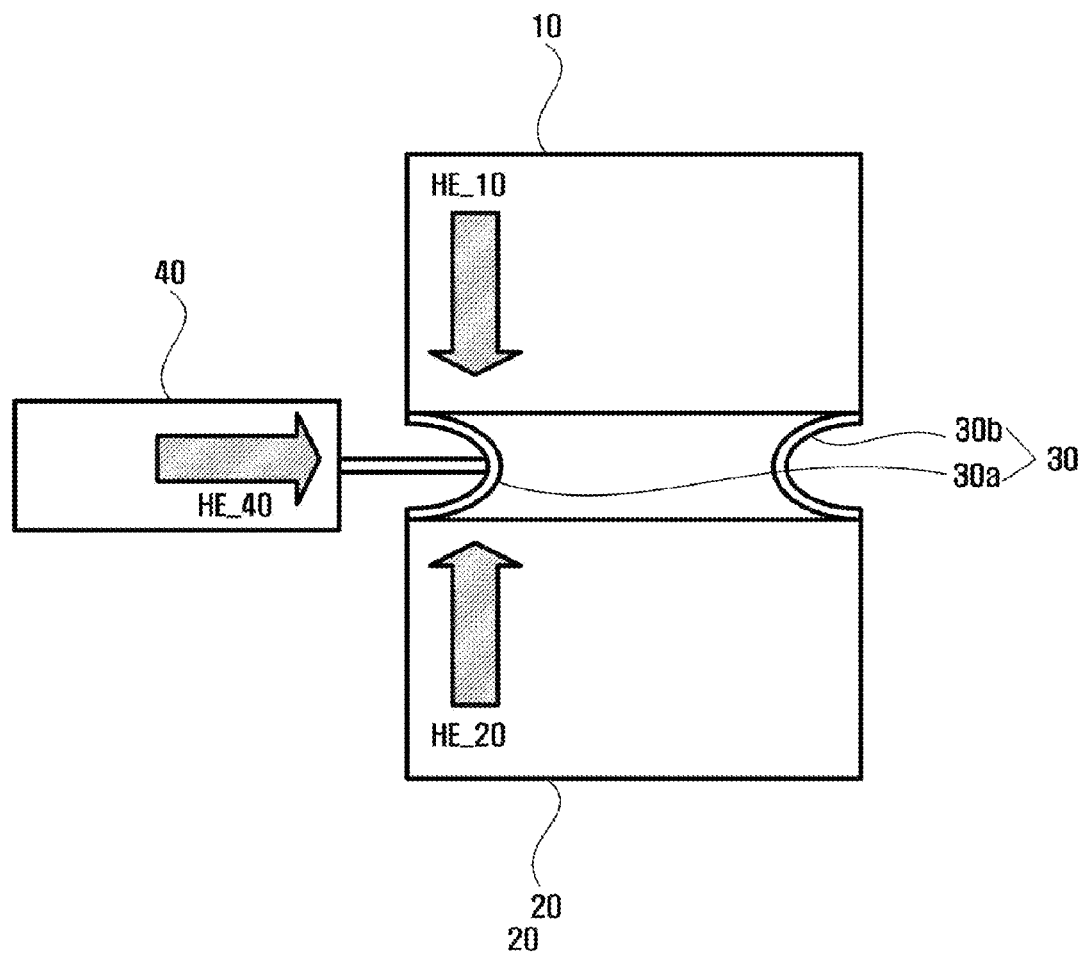
Figure 6:
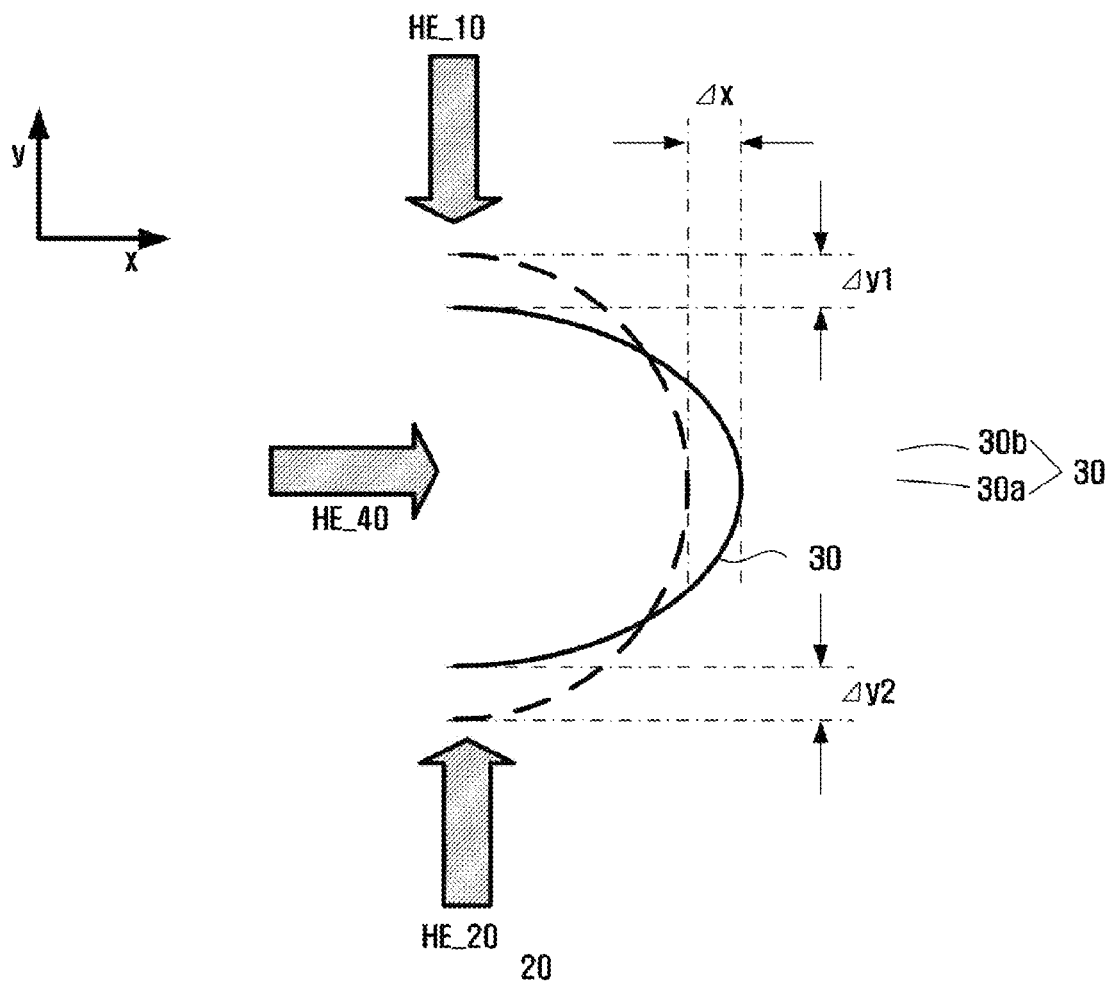

Furthermore, the principle of transforming a circular elastic body (30) due to an external force will be described with reference to FIGS. 2 to 6. FIGS. 2 and 3 illustrate the principle of transforming a circular elastic body due to an external force, and FIGS. 4 to 6 illustrate transformed structures of the elastic body (30) shown in FIG. 1 as a result of thermal expansion.

In a case where a compressive force or a tensile force is applied to the tuning fork 40 based on internal thermal expansion, rather than the external force, the resonance frequency of the tuning fork 40 varies, as if the acceleration is applied. For the reason stated above, it is difficult to distinguish an output change due to thermal expansion and external acceleration. Therefore, in order to minimize temperature sensitivity in the tuning fork 40, the MEMS resonating accelerometer according to the embodiment of the present invention offsets the tensile force (or the compressive force) applied to the tuning fork 40 caused by thermal expansion by using the characteristics of the circular elastic body.

The principle of offsetting the temperature sensitivity will now be described with reference to FIGS. 2 and 3. An exemplified circular elastic body (C_a) may be temporarily transformed into an oval elastic body (C_b) due to an external force (F). If the circular elastic body (C_a) is an ideal circular elastic body, the following relationship may be established: Δx=Δy. The diameter of the circular elastic body (C_a) decreases in a first axis (y-axis) direction in which the external force (F) is applied, the diameter of the circular elastic body (C_a) increases in a direction of second axis (x-axis) perpendicular to the first axis.

Therefore, in an example of a transformed oval elastic body (C_b), as shown in FIG. 3, the x-axis longer radius is (r+Δx) and the y-axis shorter radius is (r−Δy(Δx)). The MEMS accelerometer according to the embodiment of the present invention includes the elastic body 30 in a shape of a circle (or arc having an opening portion produced by removing a portion of the circle), which is at contact between each of the first inertial mass 10, the second inertial mass 20 and the tuning fork 40, using the characteristics of the circular elastic body.

Referring to FIG. 4, since one end of each of the first inertial mass 10, the second inertial mass 20 and the tuning fork 40 is fixed by an anchor part, thermal expansion occurs in each direction indicated by an arrow when the temperature of a resonator rises. When the first inertial mass 10, the second inertial mass 20 and the tuning fork 40 are formed using the same material, or different materials having the same thermal expansion coefficient, the same tensile force may be applied to the first inertial mass 10, the second inertial mass 20 and the tuning fork 40.

In addition, in the illustrated embodiment shown in FIG. 4, the only consideration is the thermal expansion occurring to the first inertial mass 10 and the second inertial mass 20 in the y-axis direction (i.e., in the up-and-down direction of FIG. 4). However, the thermal expansion may also occur to the first inertial mass 10 and the second inertial mass 20 in the x-axis direction. For example, the elastic body 30 is shifted by X1 in the right direction of FIG. 4 by y-axis thermal expansion (HE_10) occurring to the first inertial mass 10, and the y-axis thermal expansion (HE_20) occurring to the second inertial mass 20, and at the same time, the first and second inertial masses 10 and 20 are subjected to thermal expansion by X2 in the left direction of FIG. 4, while the tuning fork 40 is subjected to thermal expansion by X3 in the right direction of FIG. 4. X3 may be equal to a subtracted value of X1 and X2.

Therefore, during thermal expansion, a vector sum of a displacement of the elastic body 30 and displacements of the first inertial mass 10 and the second inertial mass 20 may be equal to, a second (x-axis) directional displacement of the tuning fork 40, the second direction being perpendicular to the first direction, the displacement of the elastic body 30 resulting from first (y-axis) directional thermal expansion occurring to the first inertial mass 10 and the second inertial mass 20, and the displacements of the first inertial mass 10 and the second inertial mass 20 resulting from second (x-axis) directional thermal expansion occurring to the first inertial mass 10 and the second inertial mass 20.

Therefore, the magnitude of thermal expansion X3 is canceled by X1 and X2 resulting no change in resonant frequency.

Referring to FIG. 5, the semi-circular elastic body 30 shown in FIG. 4 may be transformed into a semi-oval elastic body 30 by the tensile force applied to the first inertial mass 10, the second inertial mass 20 and the tuning fork 40. The first and second inertial masses 10 and 20 press the elastic body 30 in such a direction as they get closer to each other, while the tuning fork 40 presses the elastic body 30 in a direction perpendicular to a direction of a applied force from the first and second inertial masses 10 and 20.

In such cases, as shown in FIG. 6, due to the tensile force (HE_10) of the first inertial mass 10, the elastic body 30 is shifted by a y-axis directional displacement Δy1 Δy2 by the tensile force (HE_20), and the magnitude of Δy1 and Δy2 are equal to each other. The elastic body 30 is shifted by Δx in the x-axis direction due to an external force applied to the elastic body 30 in the y-axis direction. The tensile force (HE_40) generated by the tuning fork 40 is equal to the tensile force (HE_10) of the first inertial mass 10 or the tensile force (HE_20) of the second inertial mass 10, the force of Δx is applied to the elastic body 30 in the x-axis direction. However, since the elastic body 30 is shifted by Δx in the x-axis direction due to the structure of the elastic body 30, x-axis displacements of the elastic body 30 and the inertial masses 10 and 20 are counterbalanced without being affected by the tensile force (HE_40) generated by the tuning fork 40.

Therefore, even if the tuning fork 40 is subjected to thermal expansion, the change due to thermal expansion is canceled by the elastic body 30, resulting reducing temperature sensitivity of the tuning fork 40. The change in frequency due to change in capacitance can be prevented since the changes caused by the thermal expansion does not get affected by the displacements in the direction of the measured acceleration of the first and second inertial masses (10, 20).

Figure 7:
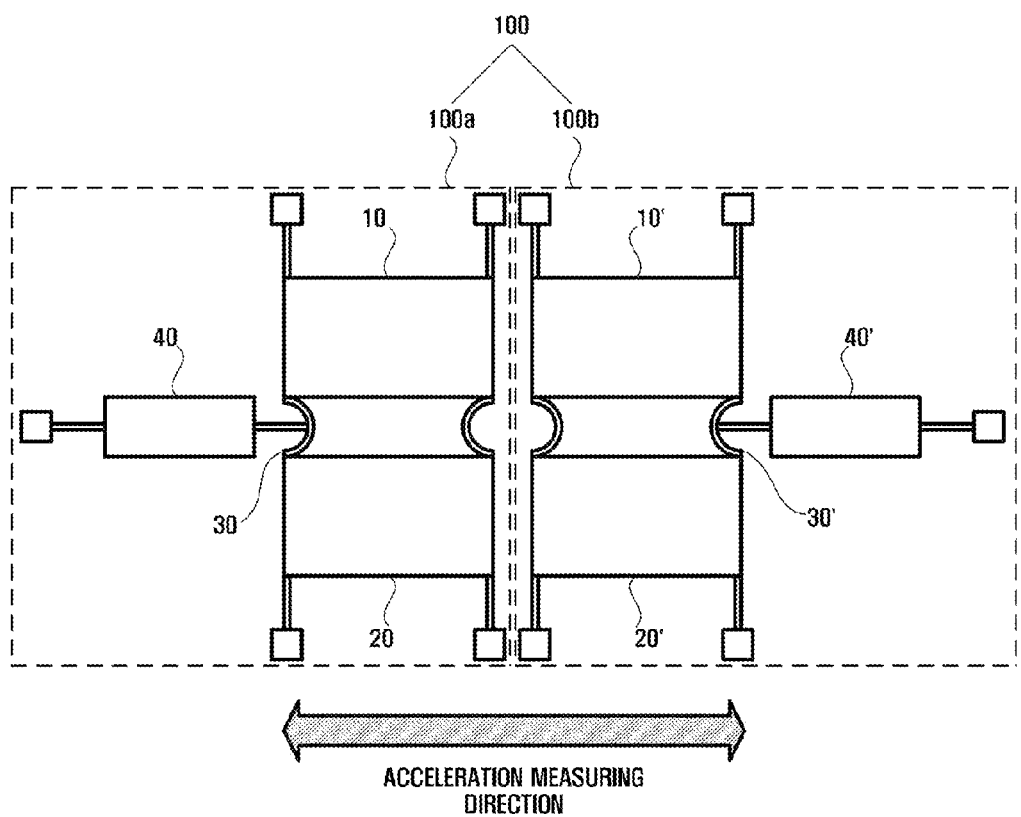
FIG. 7 is a schematic view of a MEMS resonating accelerometer referencing to another embodiment of the present invention.

FIG. 7 is a schematic view of a MEMS resonating accelerometer according to another embodiment of the present invention.

In the MEMS resonator 100 according to the embodiment of the present invention, as shown in FIG. 1, two units of the resonators 100a and 100b are connected side by side, thereby constituting one single resonator 100. The respective resonator modules 100a and 100b operates independently and may increase the accuracy of the measured acceleration.

The foregoing embodiments have been described to practice the MEMS resonating accelerometer of the present invention but these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

While the present invention has been particularly illustrated and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A micro electro mechanical system (MEMS) resonating accelerometer, comprising
   a first inertial mass;
   a second inertial mass which is spaced a predetermined distance apart from the first inertial mass on a first axis;
   an elastic body which is provided between the first and second inertial masses to apply elasticity; and
   a tuning fork which is connected to the elastic body and measures a change of frequency according to acceleration, wherein a longitudinal direction of the tuning fork is parallel to a second axis which is perpendicular to the first axis, the elastic body has an opening portion being in a circular shape with a portion removed, and one end of the tuning fork penetrates the opening portion and is connected to an inner surface of the elastic body.

2. The MEMS resonating accelerometer of claim 1, wherein the elastic body is in a semi-circular shape, and the one end of the tuning fork penetrates a center of an inside of the semi-circular shape of the elastic body to then be connected to the inner surface of the elastic body.

3. The MEMS resonating accelerometer of claim 2, wherein the tuning fork is connected to a central portion of the inner surface of the elastic body.

4. The MEMS resonating accelerometer of claim 1, wherein the first and second inertial masses and the elastic body have the same thermal expansion coefficient.

5. The MEMS resonating accelerometer of claim 1, wherein one end of each of the first and second inertial masses is fixed such that the first and second inertial masses undergo thermal expansion in a such direction as the first and second inertial masses get closer to each other or distant from each other, and one end of the tuning fork is fixed such that the tuning fork undergoes thermal expansion in a such direction as the tuning fork gets closer to or distant from the first and second inertial masses.

6. The MEMS resonating accelerometer of claim 1, wherein during thermal expansion, a vector sum of a displacement of the elastic body resulting from first-axis directional thermal expansion of the first inertial mass and the second inertial mass, and displacements of the first inertial mass and the second inertial mass resulting from second-axis directional thermal expansion is equal to a displacement of the tuning fork in a direction of the second axis perpendicular to the first axis.

* * * * *